UNITED STATES PATENT OFFICE.

OSKAR GÜNTHER, OF LEVERKUSEN, NEAR COLOGNE, GERMANY, ASSIGNOR TO SYNTHETIC PATENTS CO., INC., OF NEW YORK, N. Y., A CORPORATION OF NEW YORK.

AZO DYESTUFFS.

1,150,675.     Specification of Letters Patent.     Patented Aug. 17, 1915.

No Drawing.     Application filed February 16, 1914. Serial No. 818,979.

*To all whom it may concern:*

Be it known that I, OSKAR GÜNTHER, doctor of philosophy, chemist, citizen of the German Empire, residing at Leverkusen, near Cologne-on-the-Rhine, Germany, have invented new and useful Improvements in Azo Dyestuffs, of which the following is a specification.

I have found that new and valuable dyestuffs capable of being further developed can be obtained by diazotizing the dyestuffs obtainable by coupling a diazo- or diazoazo compound with a 1-amino-2-naphthol-ether compound with a free 4-position and by combining the resulting diazo compound with such a derivative of a 2-aminonaphthol sulfonic acid, e. g., 2-amino-5-naphthol-7-sulfonic acid and 2-amino-8-naphthol-6-sulfonic acid as contain a diazotizable amino group in a heteronuclear side chain. By heteronuclear side chain I mean a side chain the nucleus of which comprises dissimilar elements such as carbon and nitrogen. The new products are after being dried and pulverized in the shape of their alkaline salts dark powders soluble in water. Upon reduction with stannous chlorid and hydrochloric acid they are broken up into an aromatic amino compound, a 1.4-diamino-2-naphtholether compound and a derivative of an amino-beta-amino-alpha-naphthol-beta-sulfonic acid containing a diazotizable amino group in a heteronuclear side chain. They dye cotton generally in blue to greenish-blue shades, which can be converted by diazotation on fiber and after treatment with suitable developers, such as phenylmethyl-pyrazolone, aceto-acetic-anilid, phenol, resorcin, etc., into greenish fast shades. They can also be developed with diazotized para-nitranilin.

In order to illustrate the new process more fully the following example is given, the parts being by weight:— The diazo compound obtained from 242 parts of 2.5-dichloroanilin-4-sulfonic acid is combined after the addition of sodium acetate with 267 parts of the 1-amino-2-naphthol-ethyl-ethyl-ether-6-sulfonic acid dissolved in soda. The resulting intermediate compound is isolated as its sodium salt, further diazotized by means of 69 parts of $NaNO_2$, the diazo compound is filtered off, stirred up with water to a paste and added at 0° to a solution of 358 parts of para-amino-benzoyl-2-amino-5-naphthol-7-sulfonic acid in an excess of ammonia. The dye is then salted out. It is a dark powder soluble in concentrated sulfuric acid with a greenish-blue coloration; dyeing cotton a bluish-green which after diazotation and on development with methyl-phenylpyrazolone changes into a beautiful yellowish-green. Being developed with diazotized para-nitranilin green shades result. The new dye has in a free state most probably the formula:

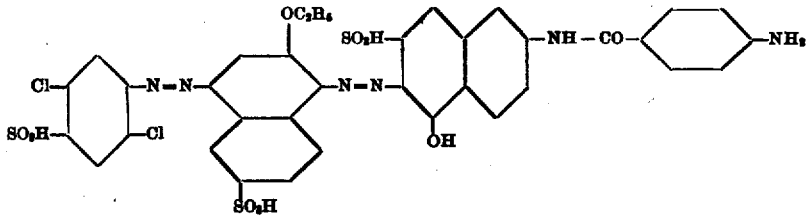

The device comprises a continuously-rotat-soluble in water with a greenish-blue coloration, yielding upon reduction with stannous chlorid and hydrochloric acid 2.5-dichloroanilin-4-sulfonic acid, 1.4-diamino-2-ethoxynaphthalene-6-sulfonic acid and 2-para-amino-benzoylamino-6-amino-5-naphthol-7-sulfonic acid.

Instead of the dichloroanilin-sulfonic acid other diazotizable aromatic amino compounds and aminoazo compounds can be used, e. g., 4-chloroanilin-2-sulfonic acid, 4.5-dichloro-anilin-2-sulfonic acid, 1-naphthylamin-7-sulfonic acid, 2-naphthylamin-5-sulfonic acid, 2-naphthylamin-8-sulfonic acid, 1-naphthyl-amin-3.7-disulfonic acid, aminoazobenzenedisulfonic acid, etc. Instead of the 1-amino-2-naphtholether sulfonic acid this ether itself, etc., can be used. Instead of the para-amino-benzoyl-2.5-aminonaphthol-7-sulfonic acid generally such heteronuclear derivatives of the said aminonaphthol-sulfonic acids can be used as contain a diazotizable amino group in the heteronuclear side chain, such as meta - aminophenyl - 1.2 -naphthimidazole-5-oxy-7-sulfonic acid (German Letters Patent 172319), para-aminophenyl-1.2-naphthothiazole-5-oxy-7-sulfonic acid, meta-amino-benzoyl - 2 - amino-5-naphthol - 7 - sulfonic acid, meta- or para-aminobenzoyl-meta-aminobenzoyl - 2 - amino - 5 - naphthol-7-sulfonic acid, para - aminobenzoyl - 2 - amino-8-naphthol-6-sulfonic acid.

I claim:—

1. The new azo dyestuffs which are after being dried and pulverized in the shape of their alkaline salts dark powders soluble in water, yielding upon reduction with stannous chlorid and hydrochloric acid an aromatic amino compound, a 1.4-diamino-2-naphtholether compound and a derivative of an amino-beta-amino-alpha-naphthol-beta-sulfonic acid containing a diazotizable amino group as part of a heteronuclear side chain; dyeing cotton generally in blue to greenish-blue shades which can be converted by diazotation on fiber and after treatment with suitable developers into greenish fast shades, and which can be developed with diazotized para-nitranilin, substantially as described.

2. The new azo dyestuffs which are after being dried and pulverized in the shape of their alkaline salts dark powders soluble in water, yielding upon reduction with stannous chlorid and hydrochloric acid an aromatic amino sulfonic acid, a 1.4-diamino-2-naphtholether compound and a derivative of amino-beta-amino-alpha-naphthol-beta - sulfonic acid containing a diazotizable amino group as part of a heteronuclear side chain; dyeing cotton generally in blue to greenish-blue shades which can be converted by diazotation on fiber and after treatment with suitable developers into greenish fast shades, and which can be developed with diazotized para-nitranilin, substantially as described.

3. The new azo dyestuffs which are after being dried and pulverized in the shape of their alkaline salts dark powders soluble in water, yielding upon reduction with stannous chlorid and hydrochloric acid a chloranilin sulfonic acid, a 1.4-diamino-2-naphtholether compound and a derivative of amino-beta-amino-alpha-naphthol-beta-sulfonic acid containing a diazotizable amino group as part of a heteronuclear side chain; dyeing cotton generally in blue to greenish-blue shades which can be converted by diazotation on fiber and after treatment with suitable developers into greenish fast shades, and which can be developed with diazotized para-nitranilin, substantially as described.

4. The new azo dyestuffs which are after being dried and pulverized in the shape of their alkaline salts dark powders soluble in water, yielding upon reduction with stannous chlorid and hydrochloric acid an aromatic amino compounds, a 1.4-diamino-2-naphtholether sulfonic acid and a derivative of amino-beta-amino-alpha-naphthol-beta-sulfonic acid containing a diazotizable amino group as part of a heteronuclear side chain; dyeing cotton generally blue to greenish-blue shades which can be converted by diazotation on fiber and after treatment with suitable developers into greenish fast shades, and which can be developed with diazotized para-nitranilin, substantially as described.

5. The new azo dyestuffs which are after being dried and pulverized in the shape of their alkaline salts dark powders soluble in water, yielding upon reduction with stannous chlorid and hydrochloric acid an aromatic amino compound, a 1.4-diamino-2-naphtholethylether-6-sulfonic acid and a derivative of amino-beta-amino-alpha-naphthol-beta-sulfonic acid containing a diazotizable amino group as part of a heteronuclear side chain; dyeing cotton generally in blue to greenish-blue shades which can be converted by diazotation on fiber and after treatment with suitable developers into greenish fast shades, and which can be developed with diazotized para-nitranilin, substantially as described.

6. The new azo dyestuffs which are after being dried and pulverized in the shape of their alkaline salts dark powders soluble in water, yielding upon reduction with stannous chlorid and hydrochloric acid an aromatic amino compound, a 1.4-diamino-2-naphtholether compound and an aminobenzoylamino - amino - naphthol - sulfonic acid; dyeing cotton generally in blue to greenish-blue shades which can be converted by diazotation on fiber and after treatment with suitable developers into greenish fast shades, and which can be developed with diazotized paranitranilin, substantially as described.

7. The new azo dyestuffs which are after being dried and pulverized in the shape of their alkaline salts dark powders soluble in water, yielding upon reduction with stannous chlorid and hydrochloric acid a chloranilin sulfonic acid, a 1.4-diamino-2-naphtholethylether-6-sulfonic acid and a derivative of amino-beta-amino-alpha-naphthol-beta-sulfonic acid containing a diazotizable amino group as part of a heteronuclear side chain; dyeing cotton generally in blue to greenish-blue shades which can be converted by diazotation on fiber and after treatment with suitable developers into greenish fast shades, and which can be developed with diazotized para-nitranilin, substantially as described.

8. The new azo dyestuffs which are after being dried and pulverized in the shape of their alkaline salts dark powders soluble in water, yielding upon reduction with stannous chlorid and hydrochloric acid a chloranilin sulfonic acid, a 1.4-diamino-2-naphtholether sulfonic acid and a derivative of amino-beta-amino-alpha-naphthol-beta-sulfonic acid containing a diazotizable amino group as part of a heteronuclear side chain; dyeing cotton generally in blue to greenish-blue shades which can be converted by diazotation on fiber and after treatment with suitable developers into greenish fast shades, and which can be developed with diazotized para-nitranilin, substantially as described.

9. The new azo dyestuffs which are after being dried and pulverized in the shape of their alkaline salts dark powders soluble in water, yielding upon reduction with stannous chlorid and hydrochloric acid an aromatic amino compound, a 1.4-diamino-2-naphtholether sulfonic acid and an aminobenzoyl-2-amino-amino-naphthol-sulfonic acid; dyeing cotton generally in blue to greenish-blue shades which can be converted by diazotation on fiber and after treatment with suitable developers into greenish fast shades, and which can be developed with diazotized para-nitranilin, substantially as described.

10. The new azo dyestuffs which are after being dried and pulverized in the shape of their alkaline salts dark powders soluble in water, yielding upon reduction with stannous chlorid and hydrochloric acid an aromatic amino compound, a 1.4-diamino-2-naphtholethylether-6-sulfonic acid and an aminobenzoyl-2-amino-amino-naphthol-sulfonic acid; dyeing cotton generally in blue to greenish-blue shades which can be converted by diazotation on fiber and after treatment with suitable developers into greenish fast shades, and which can be developed with diazotized para-nitranilin, substantially as described.

11. The new azo dyestuffs which are after being dried and pulverized in the shape of their alkaline salts dark powders soluble in water, yielding upon reduction with stannous chlorid and hydrochloric acid an aromatic amino sulfonic acid, a 1.4-diamino-2-naphtholethylether-6-sulfonic acid and an aminobenzoyl-2-amino-amino-naphthol-sulfonic acid; dyeing cotton generally in blue to greenish-blue shades which can be converted by diazotation on fiber and after treatment with suitable developers into greenish fast shades, and which can be developed with diazotized para-nitranilin, substantially as described.

12. The new azo dyestuffs which are after being dried and pulverized in the shape of their alkaline salts dark powders soluble in water, yielding upon reduction with stannous chlorid and hydrochloric acid a chloranilin sulfonic acid, a 1.4-diamino-2-naphtholether-sulfonic acid and an aminobenzoyl-2-amino-amino-naphthol-sulfonic acid; dyeing cotton generally in blue to greenish-blue shades which can be converted by diazotation on fiber and after treatment with suitable developers into greenish fast shades, and which can be developed with diazotized para-nitranilin, substantially as described.

13. The new azo dyestuffs which are after being dried and pulverized in the shape of their alkaline salts dark powders soluble in water, yielding upon reduction with stannous chlorid and hydrochloric acid a chloranilin sulfonic acid, a 1.4-diamino-2-naphtholethylether-6-sulfonic acid and an aminobenzoyl-2-amino-amino-naphthol-sulfonic acid; dyeing cotton generally in blue to greenish-blue shades which can be converted by diazotation on fiber and after treatment with suitable developers into greenish fast shades, and which can be developed with diazotized para-nitranilin, substantially as described.

14. The new azo dyestuff having in a free state most probably the formula:

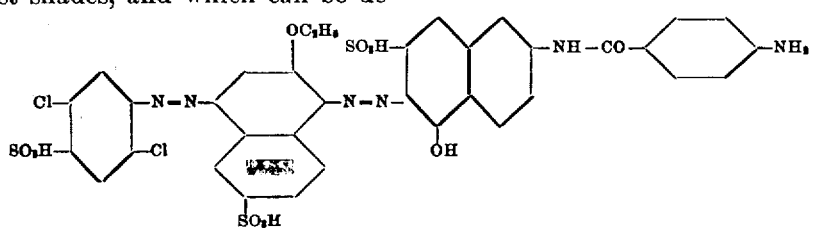

which is after being dried and pulverized a dark powder soluble in concentrated sulfuric acid and in water with a greenish-blue coloration; yielding upon reduction with stannous chlorid and hydrochloric acid 2.5-dichloroanilin-4-sulfonic acid, 1.4-diamino-2-ethoxynaphthalene-6-sulfonic acid and 2-para-amino-benzoylamino-6-amino-5- naphthol-7-sulfonic acid; dyeing cotton a bluish-green which after diazotation and on development with methylphenyl-pyrazolone changes into a beautiful yellowish-green; being developed with diazotized para-nitranilin into green shades, substantially as described.

In testimony whereof I have hereunto set my hand in the presence of two subscribing witnesses.

OSKAR GÜNTHER.

Witnesses:
 RUDOLF FELDMÜLLER,
 LOUIS VANDORY.

Corrections in Letters Patent No. 1,150,675.

It is hereby certified that in Letters Patent No. 1,150,675, granted August 17, 1915, upon the application of Oskar Günther, of Leverkusen, near Cologne, Germany, for an improvement in "Azo Dyestuffs," errors appear in the printed specification requiring correction as follows: Page 1, line 48, strike out the word "ethyl," second occurrence; same page, strike out line 67; and that the said Letters Patent should be read with these corrections therein that the same may conform to the record of the case in the Patent Office.

Signed and sealed this 9th day of November, A. D., 1915.

[SEAL.]

J. T. NEWTON,
*Acting Commissioner of Patents.*